June 19, 1923. 1,459,356
F. M. BIRD
VALVE GRINDING TOOL
Filed Aug. 17, 1921
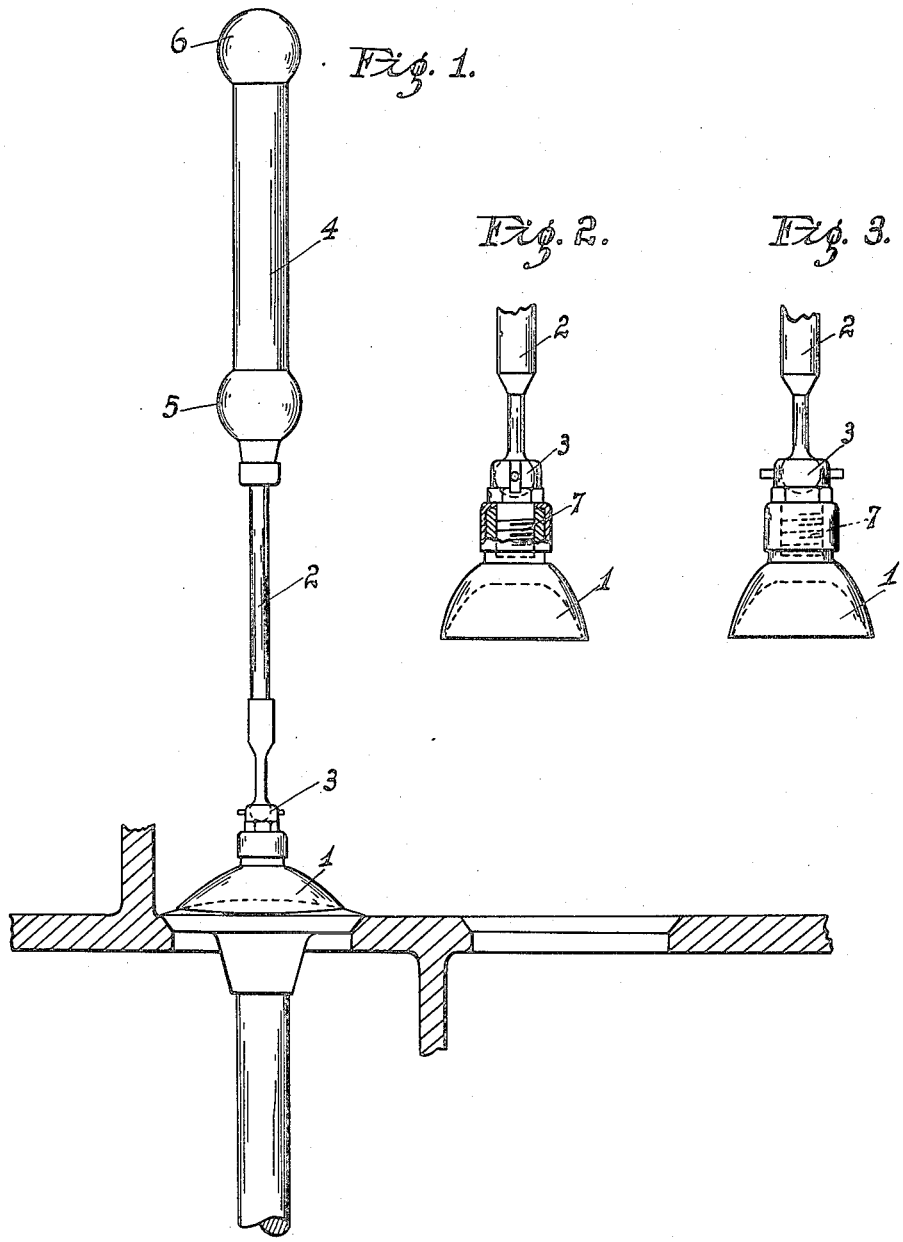
Inventor
Frank M. Bird.
By Harry C. Schroeder
Attorney Patented June 19, 1923.

1,459,356

UNITED STATES PATENT OFFICE.

FRANK M. BIRD, OF OAKLAND, CALIFORNIA.

VALVE-GRINDING TOOL.

Application filed August 17, 1921. Serial No. 492,915.

*To all whom it may concern:*

Be it known that I, FRANK M. BIRD, a citizen of the United States, residing at Oakland, in the county of Alameda and State of California, have invented certain new and useful Improvements in Valve - Grinding Tools, of which the following is a specification.

My invention is an improved valve grinding tool which may be readily applied to the valve and held at different angles while rotating and grinding the valve.

Referring to the annexed drawing in which my invention is illustrated and which forms a part of this specification:

Figure 1 is a side elevation of my valve grinding tool applied to a gas engine valve.

Figure 2 is an enlarged side elevation of the application end of the tool.

Figure 3 is a view similar to Fig. 2 except that it is taken at right angles to Figure 2.

My valve grinding tool includes a vacuum cup 1, a shaft 2, a universal joint 3 connecting said cup to one end of said shaft, and a handle 4 connected to the other end of said shaft. The handle 4 is cylindrical and formed with knobs 5 and 6 at its lower and upper ends. The vacuum cup 1 is made of resilient material such as rubber.

In operation the open end of the cup 1 is applied to the upper surface of the valve and compressed by the application of pressure to the handle 4 to expel the air from the cup, whereupon the cup grips the valve firmly. (See Fig. 1). The tool is rotated by the operator's open hands which he applies to opposite sides of the handle and moves backwardly and forwardly with relation to each other. The knobs 5 and 6 prevent the operator's hands from slipping off the ends of the handle. The universal joint 3 enables the operator to hold the handle 4 at different angles, which is of considerable advantage when other parts are in the way or when it is awkward to hold the handle straight.

The joint 3 has a threaded shank 7 which is screwed into the cup 1, thereby securing the joint and cup together. The shank is threaded approximately one half of the distance from its lower end. This method of holding the cup enables the cup to be interchanged and prevents loosening.

Having described my invention, I claim:

In a valve grinding tool, a handle formed with a knob at each end for operating said tool, a stem projecting from said handle, a vacuum cup member constructed of soft rubber or similar material and adapted to grip the top of a poppet valve, said vacuum cup member being formed with a hollow cylindrical portion, a screw threaded stud adapted to be screwed into the hollowed out portion of the vacuum cup member, said stud being screw threaded about its lower portion above said screw threaded portion, a collar on the upper part of said stud constituting a flange, a cylindrical socket member in the form of a shell adapted to fit around said stud between said collar and the upper part of the cylindrical portion of said vacuum cup member and a universal joint connection between said stud and said stem.

In testimony whereof I affix my signature.

FRANK M. BIRD.